Nov. 1, 1938.  F. R. BALCAR  2,135,271
METHOD OF RECOVERING OLEFINE OXIDES FROM GASEOUS MIXTURES
AND HYDROLYZING TO FORM CORRESPONDING GLYCOLS
Filed July 29, 1937
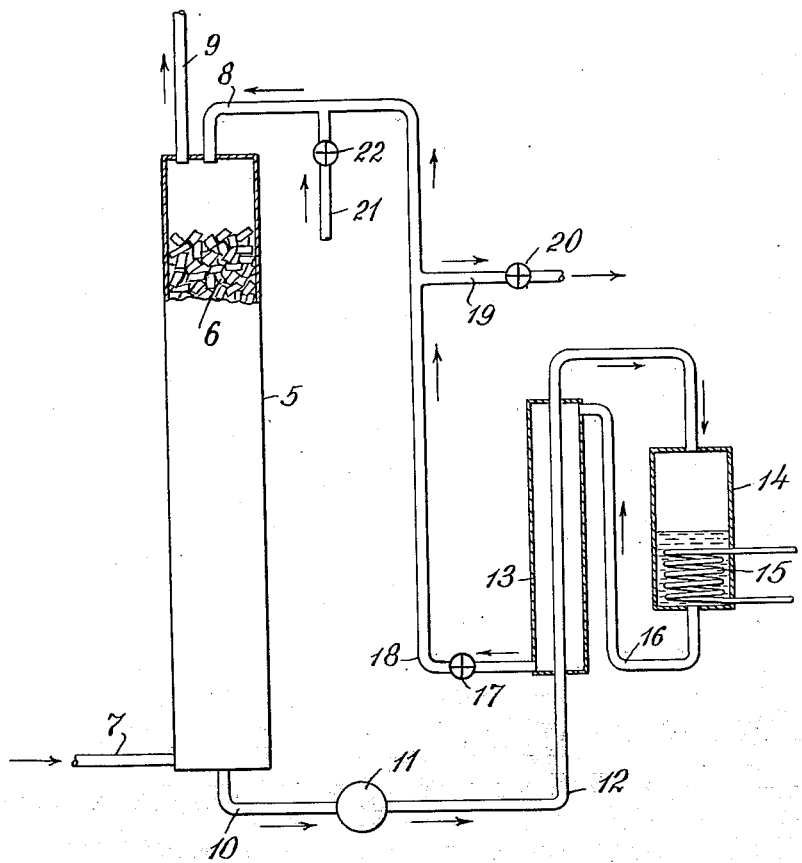
INVENTOR
Frederick R. Balcar
BY
Pennie Davis Marvin & Edmonds
ATTORNEYS Patented Nov. 1, 1938

2,135,271

UNITED STATES PATENT OFFICE 2,135,271

METHOD OF RECOVERING OLEFIN OXIDES FROM GASEOUS MIXTURES AND HYDROLYZING TO FORM CORRESPONDING GLYCOLS

Frederick R. Balcar, Stamford, Conn., assignor, by mesne assignments, to U. S. Industrial Alcohol Co., New York, N. Y., a corporation of West Virginia Application July 29, 1937, Serial No. 156,366

15 Claims. (Cl. 260—635)

This invention relates to the recovery of olefin oxides from gaseous mixtures, particularly such as are produced by the direct oxidation of olefins with air or oxygen and the production of the corresponding glycols by hydrolyzing the olefin oxides.

The direct oxidation of olefins, such as ethylene, propylene and the like, results in gaseous mixtures containing relatively small amounts of the olefin oxide, together with much larger proportions of inert or diluent gases such as oxygen, nitrogen, carbon monoxide, carbon dioxide, and unoxidized olefins. The recovery of the olefin oxide from such gaseous mixtures presents numerous difficulties in respect to commercial operation, in which it is necessary to handle very large quantities of gases in order to recover the olefin oxide or its derivatives in commercially practicable quantities.

Theoretically, olefin oxide may be recovered from a gaseous mixture containing it by passing the gaseous mixture over an absorbent such as charcoal, which removes the olefin oxide preferentially from the gaseous mixture. Alternatively, the olefin oxide may be condensed from a gaseous mixture by refrigeration, or the two methods may be combined with simultaneous cooling and absorption of the olefin oxide from the gaseous mixture. To apply such methods on a commercial scale would require very large apparatus and the heating and cooling of a large volume of absorbent material or cooling of all the gases to a very low temperature. In either case, the added cost of the ultimate product is too high to afford any prospect of commercial success under present conditions.

It is the object of the present invention to provide a simple and effective method of recovering olefin oxide from gaseous mixtures in which it is present in relatively small proportions and to convert the olefin oxide into the corresponding glycol which is accumulated in the absorber until the concentration is sufficient to warrant separation.

Another object of the invention is to afford a cyclic absorption method for olefin oxide in which the conversion of the oxide into the corresponding glycol permits re-use of the absorption agent and the ultimate concentration of the olefin glycol to a point where separation is commercially practicable.

Other objects and advantages of the invention will be apparent as it is better understood by reference to the following specification and the accompanying drawing, which illustrates diagrammatically an apparatus adapted for the practice of the invention, it being understood that the drawing is merely illustrative of the procedure and is subject to numerous modifications.

My invention depends upon the discovery that olefin oxide may be separated from gaseous mixtures containing it by scrubbing with a suitable solvent which may be water, preferably slightly acidulated, and that subsequent heating of the solution under suitable conditions will hydrolyze the olefin to the corresponding glycol, and that the solution containing the glycol may be used thereafter to absorb further quantities of the olefin oxide which may again be hydrolyzed. Thus, the absorbent may be cycled continuously, each cycle affording an increment in the olefin glycol product, until the concentration is such as to warrant separation of the glycol from all or a part of the absorbent.

In carrying out the invention, the gaseous mixture may be prepared in any suitable manner, although the invention is designed particularly for the treatment of gaseous mixtures resulting from the direct oxidation of olefins with air or oxygen. Such gaseous mixture, containing a relatively small proportion of olefin oxide, may be passed through any suitable scrubbing apparatus, preferably a tower, in which the gaseous mixture is brought into intimate contact with a relatively large volume of an absorbent such as water. Preferably the water is acidulated by the addition thereto of small quantities of suitable acids. Sulphuric acid, hydrochloric acid, and phosphoric acid have been used successfully for the purpose. Other mineral acids may be employed, and in fact hydration can be conducted in the presence of any hydration catalyst whether acid, alkaline or neutral, and may be effected in the absence of a catalyst as by the mere application of heat to the water solution containing the olefin oxide:

The gaseous mixture containing the olefin oxide passes preferably counter-current to the absorbent in the tower, which may be filled with rings, balls or other devices adapted to increase the superficial contact between the gaseous mixture and the absorbent or, if preferred, trays may be employed in the tower for the same purpose. The gaseous mixture which leaves the scrubber is substantially free from its olefine oxide content and may be disposed of in any appropriate manner.

The absorbent liquid containing the olefin oxide in solution is withdrawn from the scrubber and is subjected to heat in a suitable container, preferably under a pressure increased slightly in order to avoid, so far as may be possible, losses due to evaporation. The resulting hydration converts the olefin oxide into the corresponding glycol, which remains in solution in the water. This solution, after releasing the pressure if increased pressure is used in the heating step, is returned to the scrubber where it again serves as an absorbent for olefin oxide. The solution which again is withdrawn from the scrubber may be subjected to heat and consequent hydration of the olefin oxide, thus increasing the concentration of the glycol in solution. The cyclic use of the absorbent which passes repeatedly through the absorption and hydration stages, ultimately produces a solution in which the glycol is relatively concentrated. All or a portion of this solution may be withdrawn, and fresh solvent may be substituted therefor as the procedure continues. The glycol can be recovered from the solution by any suitable procedure.

The method as described affords a simple and very effective procedure for the treatment of gaseous mixtures containing relatively small proportions of olefin oxide, since substantially all of the olefin oxide in the gaseous mixture is dissolved and converted into the corresponding glycol which is concentrated in the absorbent and eventually may be recovered in commercially practicable quantities. The necessary apparatus and equipment is relatively inexpensive, and the operation is readily controllable so as to afford maximum efficiency. The temperatures and pressures required in the operation of the system are relatively low, so that the operation does not require large amounts of power or heat, thus materially reducing the cost of operation.

Referring to the drawing, which illustrates the preferred embodiment of the apparatus, 5 indicates a tower-scrubber which, as hereinbefore indicated, may be filled with rings or other elements 6 adapted to increase the contact of the entering gaseous mixture with the liquid flowing through the tower. The gaseous mixture containing olefin oxide is introduced from any suitable source through a pipe 7 and passes upwardly in contact with the liquid supplied by a pipe 8 and descending through the tower. The gaseous mixture escapes through a pipe 9 after the olefin oxide has been scrubbed therefrom. The liquid is withdrawn through a pipe 10 and passes through a pump 11 which serves to maintain the desired pressure during the subsequent heating operation. The pipe 12 delivers the liquid to a heat exchanger 13 and thence to a chamber 14 where heat is supplied by means of a steam coil 15 or other convenient means. In the chamber 14, the heat supplied causes hydration of the olefin oxide to the corresponding glycol. The liquid is withdrawn through a pipe 16 and passes through the heat exchanger 13 in heat exchange relation with the liquid in the pipe 12, so that the heat supplied is conserved during the operation. It should be noted that if it is desired to operate the tower 5 and chamber 14 at or near the same temperature, interchanger 13 may be omitted. At the same time, all or a part of the heat required by the system may be supplied by allowing the gas to enter the tower 5 at an elevated temperature. The liquid passes through a pressure releasing valve 17 and thence through a pipe 18 to the pipe 8 which returns it to the tower 5. When the concentration of the glycol in solution has reached a sufficient point, all or a portion of the solution may be withdrawn through a pipe 19 controlled by a valve 20. Fresh absorbent liquid may be introduced through a pipe 21 and valve 22 to replace the liquid which is withdrawn through the pipe 19, or which may be lost by vaporization in the tower 5. It should be noted that the loss of liquid by evaporation from tower 5 may be reduced or eliminated altogether by saturating the entering gas with water vapor at the temperature at which the tower is operated. In this way, the loss of water from the solution may be avoided and at the same time the loss of the heat required to vaporize the water in the tower is avoided. If the gas to be scrubbed has been formed at elevated temperatures, all or a part of the heat content of the gas at the elevated temperature may advantageously be utilized in saturating the gas with water vapor before it enters the tower 5. As hereinbefore indicated, the solution containing olefin glycol can be treated for the recovery of the glycol.

While hydration can be effected in the absence of acid, I employ preferably acidulated water as the absorbent, since the acid is an effective catalyst for hydration of the olefin oxide. I have found that sulphuric acid at a concentration of about 0.5% by weight is particularly effective, and that hydration of ethylene oxide in the presence of sulphuric acid at such concentration may be carried out at about 50-70° C. in ½ hour or less. A concentration of about 0.5% by weight of hydrochloric acid permits completion of the hydration at or about 100° C. in about 20 minutes. Phosphoric acid in low concentration is also an effective hydration catalyst.

It will be understood, of course, that wide variation of the concentration of the acid and of the particular acid employed, as well as the temperature and time required for hydration, is possible. These details are not critical, and the invention does not depend thereon, since any suitable hydration catalyst can be employed and the temperature and time can be adjusted for maximum efficiency. The size of the chamber 14 and the volume of absorbent employed can be selected so as to permit retention of the solvent in the chamber for a sufficient period of time to effect satisfactory hydration.

The final concentration of glycol in the liquid cycle may likewise be varied within wide limits. It may be increased as a rule until there is appreciable loss of glycol or olefin oxide in the waste gases or until undesired side reactions occur during hydration, or until the temperature and time of residence necessary for hydration of the olefin oxide become excessive. Obviously, the withdrawal of all or a part of the solution for the recovery of glycol will be governed by factors which ensure maximum possible efficiency of operation under particularly selected conditions.

The pressure which is maintained in the chamber 14 is also not critical. Pressure is desirable primarily because it reduces evaporation, although it may also accelerate hydration. Any suitable pressure may be selected, therefore, in view of other conditions existing, to improve the efficiency of the operation.

As an example of the operation, I pass 200-300 cu. ft. per hour of a gaseous mixture containing small quantities of ethylene with sufficient oxygen to ensure oxidation thereof through a catalytic mass, thereby converting a portion of the ethylene into ethylene oxide. The gaseous mixture containing ethylene oxide is scrubbed in a tower approximately 12 inches in diameter by 12 feet high. Water containing 0.5% of sulphuric acid by weight was used as the absorbent, which was maintained at a temperature of between 50° and 70° C. The total volume of the absorbent liquid was from 10 to 15 gallons. Practically all of the ethylene oxide was absorbed from the gaseous mixture and was converted into ethylene glycol.

In another series of tests, 1200 to 1500 cu. ft. per hour of gaseous mixture containing a small proportion of ethylene oxide was scrubbed, in a tower of the size above indicated, with a water solution containing about 0.5% of sulphuric acid by weight. The temperature of the absorbent liquid was as in the preceding example. The ethylene oxide content of the gaseous mixture was between 1% and 2%, and the total volume of scrubbing liquid was approximately 35 gallons. At the end of a series of tests, the scrubbing liquid contained approximately 12% of ethylene glycol.

It is not absolutely essential to employ an acid as a hydration catalyst. Thus, a water solution containing about 2% by weight of ethylene oxide, together with some ethylene glycol, was heated to 100° C. The hydration of the ethylene oxide was about 70% completed in approximately ½ hour. At a temperature of 140–150° C., hydration of ethylene oxide was substantially completed in less than 1 hour. Consequently, by increasing the time and temperature, hydration of olefin oxide can be effected so as to produce olefin glycols in accordance with the present invention. The use of a catalyst such as an acid decreases the necessary temperature and time, and this improves the efficiency. For this reason, I prefer to employ an acid as described or some other suitable catalyst.

Various changes may be made in the details of procedure and in the apparatus employed, without departing from the invention or sacrificing any of the advantages thereof.

I claim:

1. The method of recovering olefin oxide from gaseous mixtures which comprises scrubbing the gaseous mixture with an aqueous liquid absorbent, heating the absorbent to convert the olefin oxide to glycol and cycling the absorbent containing glycol through the scrubbing and heating stages until the glycol concentration is substantially augmented.

2. The method of recovering olefin oxide from gaseous mixtures which comprises scrubbing the gaseous mixture with an aqueous liquid absorbent, heating the absorbent to convert the olefin oxide to glycol, cycling the absorbent containing glycol through the scrubbing and heating stages until the glycol concentration is substantially augmented, withdrawing a portion of the absorbent from the cycle and replacing the portion withdrawn with fresh absorbent liquid.

3. The method of recovering olefin oxide from gaseous mixtures which comprises scrubbing the gaseous mixture with an aqueous liquid absorbent containing an hydration catalyst, heating the absorbent to convert the olefin oxide to glycol, and cycling the absorbent containing glycol through the scrubbing and heating stages until the glycol concentration is substantially augmented.

4. The method of recovering olefin oxide from gaseous mixtures which comprises scrubbing the gaseous mixture with an aqueous liquid absorbent containing an acid hydration catalyst, heating the absorbent to convert the olefin oxide to glycol, and cycling the absorbent containing glycol through the scrubbing and heating stages until the glycol concentration is substantially augmented.

5. The method of recovering olefin oxide from gaseous mixtures which comprises scrubbing the gaseous mixture with an aqueous liquid absorbent, increasing the pressure on the liquid, heating the absorbent to convert the olefin oxide to glycol, and cycling the absorbent containing glycol through the scrubbing and heating stages until the glycol concentration is substantially augmented.

6. The method of recovering ethylene oxide from gaseous mixtures which comprises scrubbing the gaseous mixture with an aqueous liquid absorbent, heating the absorbent to convert the ethylene oxide to glycol and cycling the absorbent containing glycol through the scrubbing and heating stages until the glycol concentration is substantially augmented.

7. The method of recovering ethylene oxide from gaseous mixtures which comprises scrubbing the gaseous mixture with an aqueous liquid absorbent, heating the absorbent to convert the ethylene oxide to glycol, cycling the absorbent containing glycol through the scrubbing and heating stages until the glycol concentration is substantially augmented, withdrawing a portion of the absorbent from the cycle and replacing the portion withdrawn with fresh absorbent liquid.

8. The method of recovering ethylene oxide from gaseous mixtures which comprises scrubbing the gaseous mixture with an aqueous liquid absorbent containing an hydration catalyst, heating the absorbent to convert the ethylene oxide to glycol, and cycling the absorbent containing glycol through the scrubbing and heating stages until the glycol concentration is substantially augmented.

9. The method of recovering ethylene oxide from gaseous mixtures which comprises scrubbing the gaseous mixture with an aqueous liquid absorbent containing an acid hydration catalyst, heating the absorbent to convert the ethylene oxide to glycol, and cycling the absorbent containing glycol through the scrubbing and heating stages until the glycol concentration is substantially augmented.

10. The method of recovering ethylene oxide from gaseous mixtures which comprises scrubbing the gaseous mixture with an aqueous liquid absorbent, increasing the pressure on the liquid, heating the absorbent to convert the ethylene oxide to glycol, and cycling the absorbent containing glycol through the scrubbing and heating stages until the glycol concentration is substantially augmented.

11. The method of recovering olefin oxides from gaseous mixtures which comprises scrubbing the gaseous mixture with an aqueous liquid absorbent, converting the olefin oxide in the absorbent to glycol, and cycling the absorbent-containing glycol through the scrubbing stage until the glycol concentration is substantially augmented.

12. The method of recovering olefin oxide from gaseous mixtures which comprises scrubbing the gaseous mixture with an aqueous liquid absorbent containing an hydration catalyst, converting the olefin oxide to glycol, and cycling the absorbent-containing glycol through the scrubbing stage until the glycol concentration is substantially augmented.

13. The method of recovering olefin oxide from gaseous mixtures which comprises scrubbing the gaseous mixture with an aqueous liquid absorbent containing an acid hydration catalyst, converting the olefin oxide to glycol, and cycling the absorbent-containing glycol through the scrubbing stage until the glycol concentration is substantially augmented.

14. The method of recovering ethylene oxide from gaseous mixtures containing it and converting it into glycol which comprises scrubbing the gaseous mixture with an aqueous liquid absorbent containing an hydration catalyst and ethylene oxide, heating the absorbent after it has absorbed additional ethylene oxide to convert ethylene oxide to glycol, and after cooling, utilizing a portion of that liquid as the scrubbing agent for the absorption of ethylene oxide from said gaseous mixture.

15. The method of recovering olefin oxide from gaseous mixtures containing it and converting it into glycol which comprises scrubbing the gaseous mixture with an aqueous liquid absorbent containing a hydration catalyst and olefin oxide, converting the olefin oxide to glycol after it has absorbed additional olefin oxide, cooling and utilizing a portion of the liquid containing glycol as the scrubbing agent for the absorption of olefin oxide from said gaseous mixture.

FREDERICK R. BALCAR.